United States Patent [19]
Marsaud et al.

[11] Patent Number: 6,050,599
[45] Date of Patent: Apr. 18, 2000

[54] PYROTECHNIC GAS GENERATOR WITH ADAPTABLE FLOW RATE AND VOLUME FOR INFLATING AIR-BAGS

[75] Inventors: Benoît Marsaud, Neauﬂes Saint Martin; Daniel Duvacquier, Bordeaux; Christian Perotto, Ballancourt, all of France

[73] Assignee: Livbag SNC, Vert Le Petit, France

[21] Appl. No.: 09/058,213

[22] Filed: Apr. 10, 1998

[30] Foreign Application Priority Data

Apr. 11, 1997 [FR] France ................................. 97 04465

[51] Int. Cl.⁷ .................................................. B60R 21/26
[52] U.S. Cl. ........................... 280/736; 280/741; 102/531
[58] Field of Search ..................................... 280/736, 740, 280/741; 102/530, 531

[56] References Cited

U.S. PATENT DOCUMENTS

| | | | |
|---|---|---|---|
| 3,972,545 | 8/1976 | Kirchoff et al. | 280/735 |
| 4,068,862 | 1/1978 | Ishi et al. | 280/740 |
| 5,738,374 | 4/1998 | Marsaud et al. | 280/741 |
| 5,799,973 | 9/1998 | Bauer et al. | 280/736 |

FOREIGN PATENT DOCUMENTS

| | | | |
|---|---|---|---|
| 0 382 552 | 8/1990 | European Pat. Off. | B60R 21/26 |
| 2 233 202 | 1/1975 | France | B60R 21/10 |
| 41 21 039 | 1/1993 | Germany | B60R 21/26 |
| 196 11 102 | 9/1997 | Germany | B60R 21/26 |

OTHER PUBLICATIONS

Research Disclosure, No. 37941, Nov. 1995, Emsworth GB, pp. 743–745.

*Primary Examiner*—Peter C. English
*Attorney, Agent, or Firm*—Pillsbury Madison & Sutro LLP

[57] ABSTRACT

A pyrotechnic gas generator for motor-vehicle safety in the form of a one-piece cylindrical body (1) which comprises a side wall (2) and a transverse wall (3) which divides the body (1) into an upstream compartment (4) and a downstream compartment (5). These compartments (4, 5) each contain a pyrotechnic charge (6, 7) and an ignition system (15, 16). A lid (30) and a can (31) are fixed to the external side wall (2) and constitute a diffusion chamber. A safety unit (26) grips part of the side wall (2) and makes it possible, depending on the electrical signals received by the generator (100), either to inflate the airbag partially or to inflate the airbag completely with the possibility of modulating the rate of inflation.

9 Claims, 3 Drawing Sheets

PYROTECHNIC GAS GENERATOR WITH ADAPTABLE FLOW RATE AND VOLUME FOR INFLATING AIR-BAGS

FIELD OF THE INVENTION

The invention relates to the field of motor-vehicle safety and relates more particularly to a driver's pyrotechnic gas generator intended to inflate an airbag.

DESCRIPTION OF THE RELATED ART

In recent years, novel pyrotechnic gas generators have appeared and allow the rate of inflation to be modulated depending on various parameters such as, for example, the nature and intensity of the impact, or the size and position of the passenger. These generators include electrical initiators which are placed in separate combustion chambers and are put into operation at different times. This delay, of the order of a few milliseconds, is performed electronically and in a programmed manner over time, so as to optimize the output of the generator and therefore the pressure level obtained in the airbag. Thus, during an impact, the passenger of the motor vehicle is effectively protected by an airbag whose inflation is more suited to the situation.

U.S. Pat. No. 3,972,545 describes a pyrotechnic gas generator for a passenger, which comprises two chambers separated by a consumable partition, each being provided with a pyrotechnic charge and with an initiator. Depending on the intensity of the impact, the two initiators connected to a single electrical supply may be triggered in a delayed fashion. When a low-voltage electrical signal is emitted, only one chamber is ignited by means of an electrical initiator, a second being ignited when the partition separating the two chambers is consumed. On the other hand, when a high-voltage signal is emitted, both initiators are activated simultaneously, thus causing simultaneous ignition of the two combustion chambers.

Patent Application EP 0,382,552 discloses a pyrotechnic gas generator more specifically designed to protect a passenger. This generator consists of a one-piece cylindrical component divided into two parts by an internal partition and has two combustion chambers each provided with a pyrotechnic charge and with an initiator. In operation, an electrical signal is emitted and the two charges are ignited so as to be delayed over time, the delay being calculated as a function of various parameters such as, for example, the weight or position of the passenger. This generator ensures, in the end, complete inflation of the airbag in 50 milliseconds.

Thus, these two generators, which make it possible to modulate the rate of inflation of the airbag, are unable to reduce, depending on the circumstances, the final volume of gas released into the airbag. In addition, the manufacture of these systems is relatively complex and therefore makes it difficult to transpose such technologies for compact low-cost generators, in particular for "driver" generators.

Those skilled in the art are therefore seeking a driver's pyrotechnic gas generator which is easy to manufacture and has a low cost, which makes it possible, depending on the situation, either to release only a certain volume of gas and therefore to inflate the airbag only partially or to release the maximum volume of gas so as to inflate the airbag completely with the possibility of adjusting the rate of inflation.

BRIEF SUMMARY OF THE INVENTION

The invention therefore relates to a pyrotechnic gas generator intended for motor-vehicle safety, which comprises, in particular, a cylindrical body having a side wall provided with two ends and with a gastight transverse wall dividing the said cylindrical body into an upstream compartment and a downstream compartment, a pyrotechnic charge and an ignition system being arranged in each compartment, the said body having at each of its ends one of the two ignition systems, characterized in that, i) the side wall has several initially blocked-off orifices in each compartment;

ii) a safety unit grips part of the side wall of the cylindrical body and allows each compartment to be isolated from the combustion gases coming from the other compartment;

iii) a casing, consisting of a lid and a can which are fastened to each other, grips the external side wall of the cylindrical body and forms a diffusion chamber around the said side wall; and iv) the casing includes vents for exhausting the combustion gases.

According to one essential characteristic of the invention, the safety unit therefore necessitates that, in each compartment, the pyrotechnic charge can be initiated only by virtue of the firing of the ignition system with which it is associated. Thus, the combustion gases arising from one of the two compartments cannot incidentally ignite the pyrotechnic charge located in the other compartment. It is therefore possible:

either to release only a limited volume of gas and therefore to inflate the airbag only partially, by initiating only the ignition system housed in the upstream compartment or that housed in the downstream compartment, or to inflate the airbag completely by initiating both ignition systems simultaneously, or with a certain time delay, the delayed firing allowing the rate of inflation of the airbag to be modulated.

Preferably, the pyrotechnic charge consists either of a pyrotechnic composition chosen from the group of compositions called "double base", i.e. compositions based on nitrocellulose and nitroglycerine, or of a composite pyrotechnic composition based on an organic binder and at least one oxidizing charge.

According to a second characteristic of the invention, in each compartment, the pyrotechnic charge is isolated from the body of the generator by a cylindrical shell. Thus, the cylindrical shell protects the pyrotechnic charge from ambient moisture and from prolonged contact with the side wall or the transverse wall of the body. Advantageously, the cylindrical shell has a side wall pressed against the said body's internal side wall. The orifices in the latter are therefore blocked off by the side wall of the cylindrical shell, which acts as burstable caps.

According to a third characteristic of the invention, in each compartment, the pyrotechnic charge is wedged between a spring bearing on the end of the side wall and a wedging ring in contact with the cylindrical shell.

Advantageously, each pyrotechnic compartment is in the form of a cylindrical block perforated by a plurality of channels which are parallel to the axis of the said block so that the said channels are parallel to the generatrices of the body. Preferably, the pyrotechnic charge housed in the upstream compartment is greater than that housed in the downstream compartment and therefore makes it possible, in operation, to generate a greater quantity of gas.

Also advantageously, the lid and the can of the casing are fastened by means of a mating face which is parallel to the axis of the cylindrical body.

Preferably, the lid has a rim serving to fix an airbag. Advantageously, this rim is parallel to the mating face of the casing.

Also preferably, the casing has a flat bottom intended to serve as a base for the generator.

According to a preferred embodiment, the safety unit consists of an annular metal band, the ends of which are joined, which includes prescored areas. Preferably, the safety unit grips the side wall of the cylindrical body in such a way that the orifices are each covered by one of the prescored areas.

Preferably, the side wall has an external peripheral indentation lying between two shoulders, this indentation serving as a housing for the safety unit and containing the said orifices. Thus, the latter is wedged between two shoulders and cannot, even in the event of a violent impact, be extracted from its housing.

It is also possible to form a safety unit by blocking off each orifice using a clip inserted into convergent grooves produced on each side of each orifice.

A generator according to the invention therefore has the following two advantages:
- on the one hand the manufacture involves only a small number of components, the assembly of which may be easily automated, thereby making it possible to reduce the manufacturing costs very considerably while guaranteeing correct and reliable inflation of the airbag, and
- on the other hand, the possibility of varying, by means of the safety unit, the volume of gas generated or the rate of inflation of the airbag provides protection suitable to the severity of the impact and to the morphology of the person to be protected.

BRIEF DESCRIPTION OF THE SEVERAL VIEWS OF THE DRAWINGS

A detailed description of the preferred embodiment is given below with reference to FIGS. 1 to 7.

DETAILED DESCRIPTION OF THE INVENTION

Figure 1:
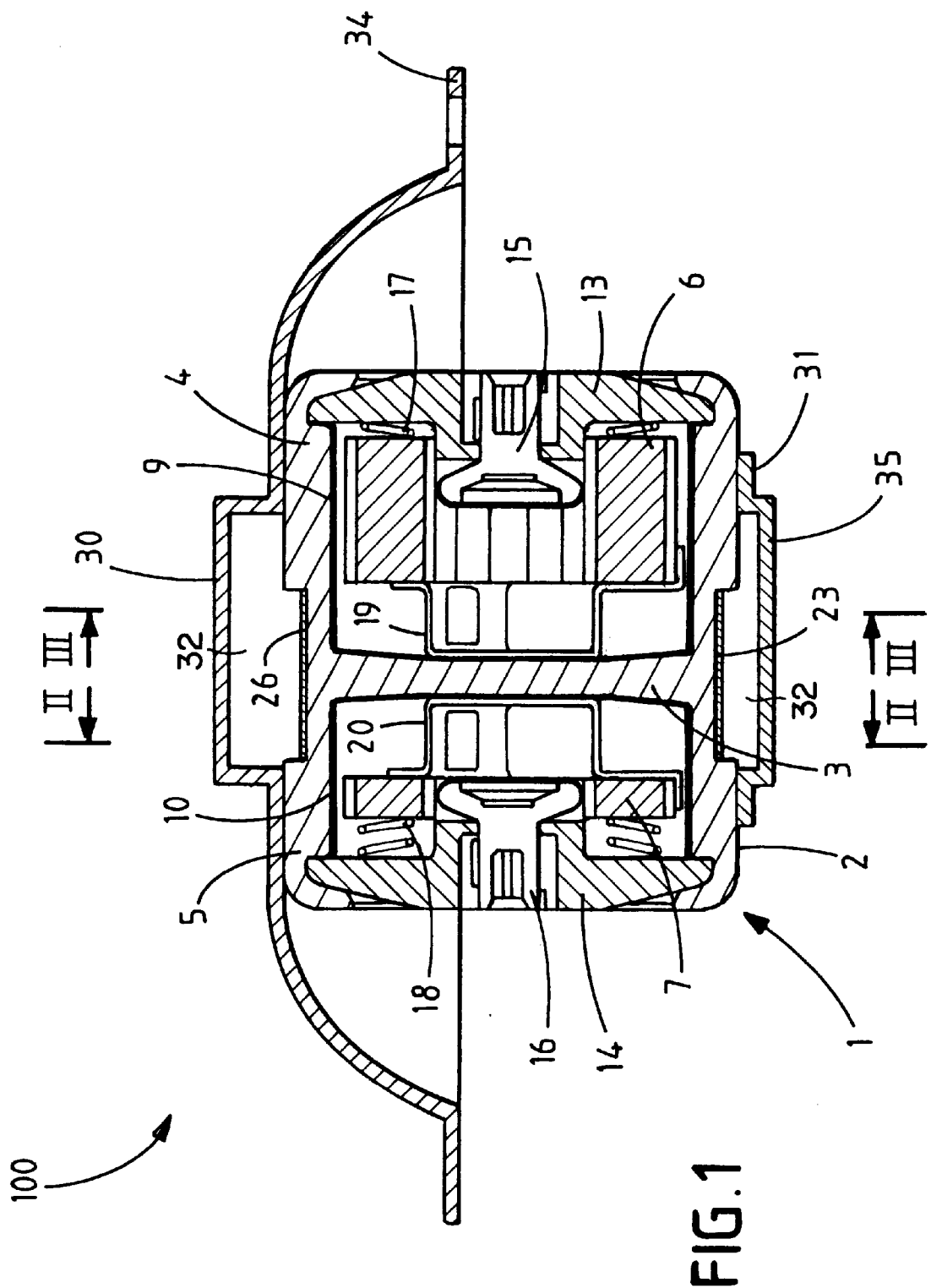
FIG. 1 is a longitudinal sectional view of a generator according to the invention.
Figure 2:
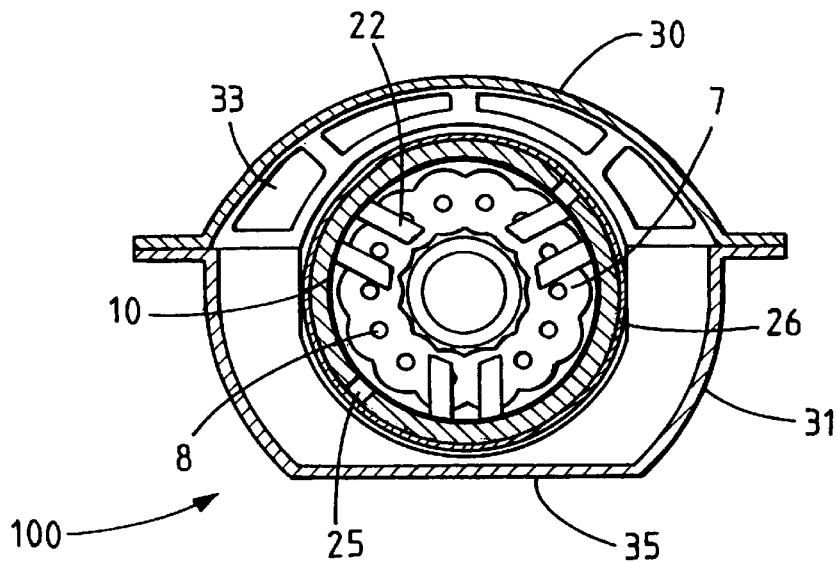
FIG. 2 is a view on the section covered as II—II of the generator shown in FIG. 1.
Figure 3:
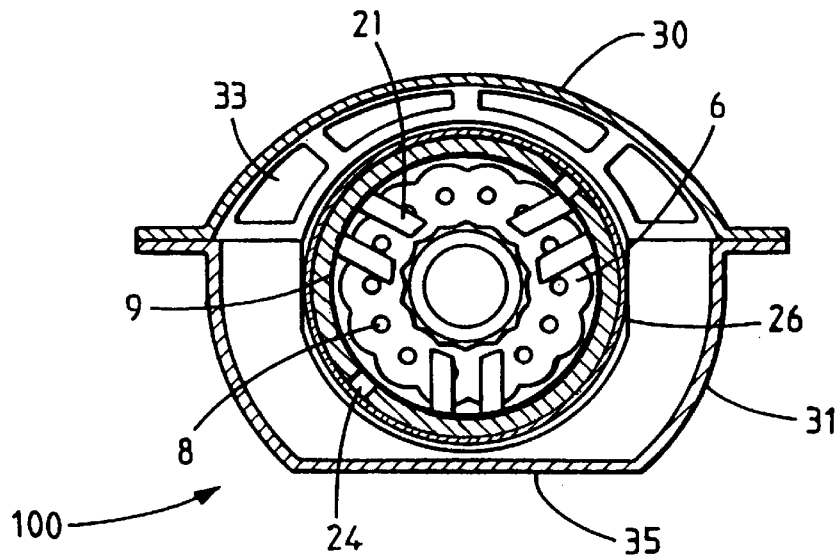
FIG. 3 is a view on the section covered as III—III of the generator shown in FIG. 1.
Figure 4:
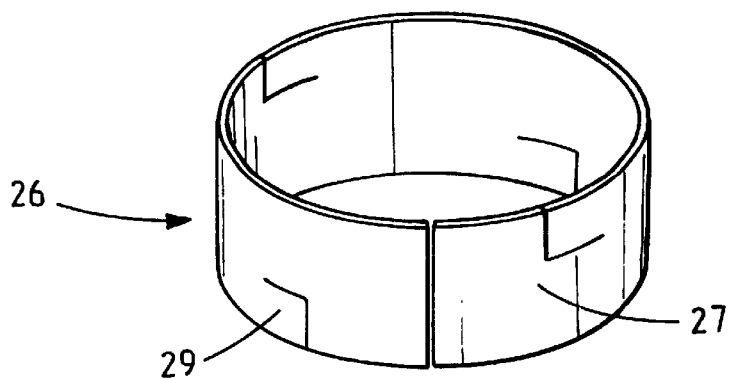
FIG. 4 is a perspective view of the safety unit of the generator according to the invention.

Referring to FIGS. 1 to 3, it may be seen that a pyrotechnic gas generator 100 according to the invention comprises a one-piece cylindrical body 1 made of a metal which is sufficiently ductile to enable it to be crimped, i.e. a metal preferably having an elongation capacity of greater than 20% and a tensile strength of greater than 400 MPa. This body 1 has a side wall 2 provided with two open ends and a gastight transverse wall 3 which divides the said body 1 into an upstream compartment 4 and a downstream compartment 5. Each compartment 4,5 contains a cylindrical block 6,7 which constitutes the pyrotechnic charge and which is perforated by a plurality of channels 8 which are parallel to the axis of the block 6,7, the latter being parallel to the generatrices of the one-piece cylindrical body 1. Each block 6,7 is isolated from the side wall 2 and from the transverse wall 3 by a cylindrical shell 9,10. The latter has a closed end bearing against the transverse wall 3, a side wall pressed against the internal side wall 2 of the body 1 and an open end hermetically bonded to a closure ring 13,14 crimped in the open end of the body 1. An electrical igniter 15,16, the connector of which is protected by a shunt, is inserted into each closure ring 13,14.

The block 6,7 is wedged in each compartment 4,5 by means of a helicoidal spring 17,18 and a wedging ring 19,20. The spring 17,18 bears both against the closure ring 13,14 and against one end of the block 6,7. The other end of the block 6,7 butts against the wedging ring 19,20 which is itself partially bonded to the closed end of the cylindrical shell 9,10. Advantageously, the wedging ring 19,20 has the shape of a cylindrical cup whose open end has tabs 21,22 which grip the block 6,7. is The side wall 2 has an external peripheral indentation 23 of constant width which extends around the transverse wall 3. In each compartment 4,5, the indentation 23 has orifices 24,25 which are initially blocked off by the side wall of the corresponding cylindrical shell 9,10.

Referring to FIGS. 1 to 4, it may be seen that a safety unit 26 consists of an annular metal band 27, the ends of which are joined, which includes prescored areas 29. This safety unit 26 grips the indentation 23 of the side wall 2 in such a way that the orifices 24 located in the upstream compartment 4 and the orifices 25 located in the downstream compartment 5 are each covered by one of the prescored areas 29.

Figure 5:
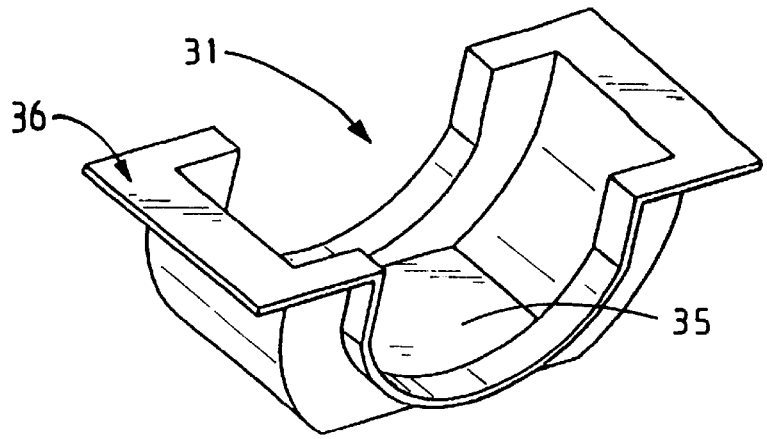
FIG. 5 is a perspective view of the can of the generator according to the invention.
Figure 6:
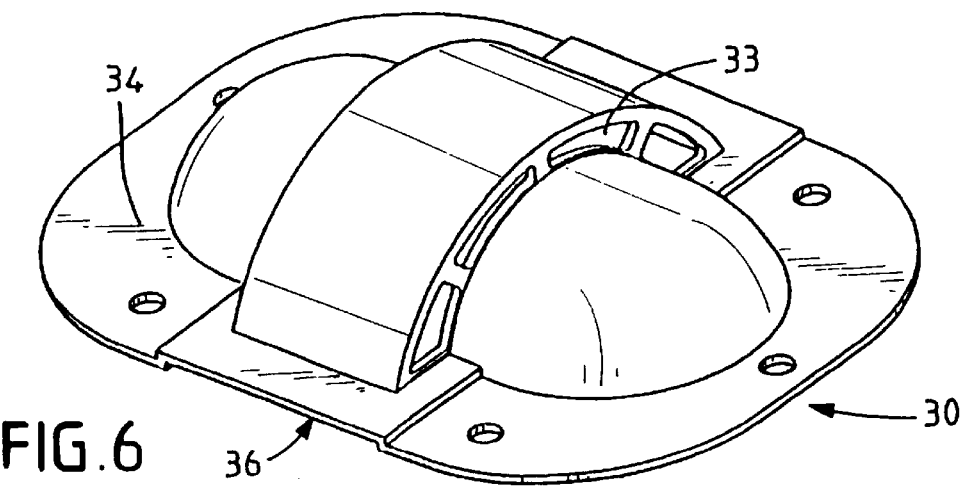
FIG. 6 is a perspective view of the lid of the generator according to the invention.
Figure 7:
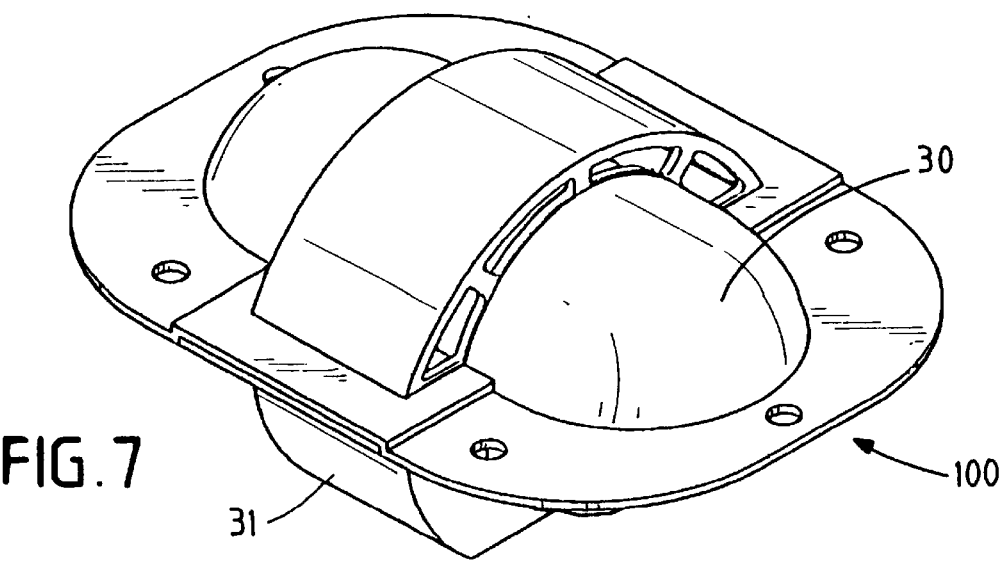
FIG. 7 is a perspective view of the generator according to the invention.

Referring to FIGS. 5 to 7, it may be seen that a lid 30 and a can 31, which are hermetically bonded to the external side wall 2 of the body 1, are fastened to each other in a gastight manner by means of mating face 36 which are parallel to the axis of the cylindrical body 1 and constitute a diffusion chamber 32 around the indentation 23 of the side wall 2. The lid 30 is provided with vents 33 for exhausting the combustion gases and has a rim 34 which is parallel to the mating faces 36 and on which an airbag (not shown) is riveted. In addition, the can 31 comprises a flat bottom 35 intended to serve as a base for the generator 100.

Such a generator 100, coupled with a multi-function detection system, allows the following operating schemes to be implemented. In the event of a slight impact, an electrical signal emitted by a collision detector triggers only one of the two igniters 15 or 16, the igniter chosen being the one whose associated pyrotechnic charge will generate the volume of gas best suited to the situation. By way of example, if the igniter 15 of the upstream compartment 4 is initiated, the combustion gases which are then generated come into contact with the block 6, thus igniting the said block 6. When the pressure reaches the burst value of the cylindrical shell 9 which blocks off the orifices 24, the said shell 9 breaks near these orifices and the gases then exert a pressure on the prescored areas 29 which cover the orifices 24, thereby causing these prescored areas to be bent in the direction of the gas flow. Next, the gases penetrate the diffusion chamber 32 which surrounds the indentation 23 of the side wall 2 in order, finally, to escape via the combustion-gas exhaust vents 33 and to inflate the airbag. The safety unit 26, certain prescored areas 29 of which cover the orifices 25, therefore makes it possible to prevent the hot gases which are generated by the block 6 from breaking the cylindrical shell 10 of the downstream compartment 5 near the orifices 25 and consequently igniting the block 7. The operation is similar when the collision detector triggers the igniter 16 housed in the downstream compartment 5 instead of the igniter 15 housed in the compartment 4.

If the impact is more severe, the two igniters 15 and 16 are fired at different times. By way of example, if the igniter 15 is first of all operated as above, the igniter 16 of the downstream compartment 5 is initiated following the said igniter 15 after a programmed time delay. The block 7 is then ignited and, when the pressure reaches a threshold value, the cylindrical shell 10 breaks near the orifices 25. The gases generated then exert a pressure on the prescored areas 29 which cover the said orifices 25, thereby causing these areas to bend in the direction of the gas flow. The gases thus penetrate the combustion chamber 32 in order, ultimately, to inflate the airbag.

Finally, when the impact is violent the two igniters 15,16 are initiated simultaneously and cause simultaneous combustion of the blocks 6 and 7.

What is claimed is:

1. Pyrotechnic gas generator (100) intended for motor-vehicle safety, which comprises a cylindrical body (1) having a side wall (2) provided with two ends (13, 14) and with a gastight transverse wall (3) dividing said cylindrical body (1) into an upstream compartment (4) and a downstream compartment (5), a pyrotechnic charge (6, 7) and an ignition system (15, 16) being arranged in each compartment (4, 5), said body having at each of its ends (13, 14) one of the two ignition systems (15, 16), characterized in that, i) the side wall (2) has several initially blocked-off orifices (24, 25) in each compartment (4, 5);

ii) a safety unit (26) grips part of the side wall (2) of the body (1) and allows each compartment (4, 5) to be isolated from combustion gases coming from the other compartment;

iii) a casing, consisting of a lid (30) and a can (31) which are fastened to each other, grips the side wall (2) of the cylindrical body (1) and forms a diffusion chamber (32) around said wide wall (2); and iv) the casing (30, 31) includes vents for exhausting the combustion gases.

2. Generator according to claim 1, wherein, in each compartment (4,5), the pyrotechnic charge (6,7) is isolated from the body (1) of the generator (100) by a cylindrical shell (9,10).

3. Generator according to claim 2, wherein, in each compartment (4,5), the pyrotechnic charge (6,7) is wedged between a spring (17,18) bearing on the respective end (13,14) and a wedging ring (19,20) in contact with the respective cylindrical shell (9,10).

4. Generator according to claim 1, wherein each pyrotechnic charge (6, 7) is in the form of a cylindrical block perforated by a plurality of channels (8) which are parallel to an axis of said block so that said channels (8) are parallel to generatrices of the body (1).

5. Generator according to claim 1, wherein the lid (30) and the can (31) of the casing are fastened by means of mating faces (36) which are parallel to an axis of the cylindrical body (1).

6. Generator according to either claim 1 or 5, wherein the lid (30) has a rim (34) serving to fix an airbag.

7. Generator according to claim 1, wherein that the safety unit (26) consists of an annular metal band (27), the ends of which are joined, which includes prescored areas (29).

8. Generator according to claim 7, wherein the safety unit (26) grips the side wall (2) of the body (1) in such a way that the orifices (24,25) are each covered by one of the prescored areas (29).

9. Generator according to either claim 7 or claim 8, wherein in that the side wall (2) has an external peripheral indentation (23) lying between two shoulders, this indentation (23) serving as a housing for the safety unit (26) and containing the orifices (24,25).

\* \* \* \* \*